United States Patent
Davis et al.

(10) Patent No.: US 11,719,127 B2
(45) Date of Patent: Aug. 8, 2023

(54) OIL DRAINBACK ASSEMBLY FOR A BEARING COMPARTMENT OF A GAS TURBINE ENGINE

(71) Applicant: United Technologies Corporation, Farmington, CT (US)

(72) Inventors: Todd A. Davis, Tolland, CT (US); Joseph D. Walker, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 835 days.

(21) Appl. No.: 16/661,425

(22) Filed: Oct. 23, 2019

(65) Prior Publication Data

US 2021/0123361 A1 Apr. 29, 2021

(51) Int. Cl.
| | |
|---|---|
| *F01D 25/18* | (2006.01) |
| *F01D 25/16* | (2006.01) |
| *F02C 7/06* | (2006.01) |
| *F16C 17/02* | (2006.01) |
| *F16C 33/10* | (2006.01) |

(52) U.S. Cl.
CPC ............ *F01D 25/18* (2013.01); *F01D 25/16* (2013.01); *F02C 7/06* (2013.01); *F16C 17/02* (2013.01); *F16C 33/106* (2013.01); *F05D 2220/32* (2013.01); *F05D 2260/602* (2013.01); *F05D 2260/98* (2013.01)

(58) Field of Classification Search
CPC .. F01D 25/18; F01D 25/16; F02C 7/06; F16C 17/02; F16C 33/106; F05D 2220/32; F05D 2260/602; F05D 2260/98
See application file for complete search history.

(56) References Cited

U.S. PATENT DOCUMENTS

| | | | |
|---|---|---|---|
| 4,862,995 A | 9/1989 | Faria | |
| 5,261,751 A * | 11/1993 | Heinz | ................. F16C 33/6685 384/466 |
| 5,813,493 A | 9/1998 | Sloan et al. | |
| 6,199,543 B1 | 3/2001 | Bedkowski | |
| 7,017,546 B1 | 3/2006 | Patel et al. | |
| 7,625,126 B2 * | 12/2009 | Peters | ..................... F01D 25/18 384/473 |
| 7,878,303 B2 | 2/2011 | Munson | |

(Continued)

FOREIGN PATENT DOCUMENTS

| | | |
|---|---|---|
| CN | 201241753 Y | 5/2009 |
| CN | 203463452 U | 3/2014 |

(Continued)

OTHER PUBLICATIONS

EP Search Report dated Mar. 5, 2021 issued for corresponding European Patent Application No. 20203444.3.

(Continued)

*Primary Examiner* — Woody A Lee, Jr.
*Assistant Examiner* — Joshua R Beebe
(74) *Attorney, Agent, or Firm* — Bachman & LaPointe, P.C.

(57) ABSTRACT

A bearing compartment of a gas turbine engine includes a rotationally fixed structure defined about an engine longitudinal axis; a gutter section formed in the front support; an oil drainback assembly mountable to the gutter section to direct oil into a drain passage to communicate oil from the gutter.

14 Claims, 6 Drawing Sheets

(56) References Cited

U.S. PATENT DOCUMENTS

| | | |
|---|---|---|
| 8,500,869 B1 | 8/2013 | Johnson et al. |
| 8,621,839 B2 | 1/2014 | Alecu et al. |
| 9,341,117 B2 | 5/2016 | Remer et al. |
| 9,650,957 B2 | 5/2017 | Cutrara et al. |
| 9,850,779 B2 | 12/2017 | Gatto et al. |
| 10,100,735 B2 | 10/2018 | Craig |
| 10,287,915 B2 | 5/2019 | Mccune |
| 11,162,421 B2 | 11/2021 | Dick et al. |
| 2006/0002645 A1 | 1/2006 | Swainson |
| 2008/0078617 A1 | 4/2008 | Glahn et al. |
| 2008/0110813 A1 | 5/2008 | Munson |
| 2008/0190091 A1 | 8/2008 | Peters et al. |
| 2008/0245614 A1 | 10/2008 | Matucheski |
| 2010/0058729 A1 | 3/2010 | Fomison et al. |
| 2012/0324899 A1 | 12/2012 | Dibenedetto et al. |
| 2015/0176492 A1* | 6/2015 | Cutrara .................. F01M 1/00 184/106 |
| 2016/0017812 A1 | 1/2016 | Sheridan |
| 2016/0356179 A1 | 12/2016 | Tennevall et al. |
| 2017/0298771 A1* | 10/2017 | Race ...................... F01D 25/18 |
| 2019/0323382 A1 | 10/2019 | Pankratov |
| 2021/0071677 A1 | 3/2021 | Schwendenmann et al. |
| 2021/0123385 A1 | 4/2021 | Schwendenmann et al. |

FOREIGN PATENT DOCUMENTS

| | | | | |
|---|---|---|---|---|
| CN | 203730508 U | 7/2014 | | |
| CN | 207750348 U | 8/2018 | | |
| DE | 102016222625 A1 | * 5/2018 | ............. | F01D 25/16 |
| DE | 102019212713 A1 | * 10/2020 | ............. | F01D 25/18 |
| FR | 2000665 A1 | 9/1969 | | |
| FR | 3037614 A1 | 12/2016 | | |
| JP | 2001140654 A | 5/2001 | | |
| WO | 2018113332 A1 | 6/2018 | | |
| WO | 2019147778 A1 | 8/2019 | | |

OTHER PUBLICATIONS

EP Search Report dated Mar. 3, 2021 issued for corresponding European Patent Application No. 20202903.9.

EP Search Report dated Feb. 9, 2021 issued for corresponding European Patent Application No. 20194406.3.

U.S. Non-Final Office action dated Feb. 4, 2022 issued for related U.S. Appl. No. 16/572,806.

U.S. Non-Final Office action dated Feb. 1, 2023 issued for related U.S. Appl. No. 16/661,459.

* cited by examiner

OIL DRAINBACK ASSEMBLY FOR A BEARING COMPARTMENT OF A GAS TURBINE ENGINE

BACKGROUND

The present disclosure relates to an oil drainback system for a sealed bearing compartment of a gas turbine engine and, more particularly, to an oil drainback assembly for such an oil drainback system.

Gas turbine engines typically contain bearing compartments, or other wetted chambers. The bearing compartments contain oil and typically include dynamic seals with an air buffered cavity to retain the oil within the bearing compartment. Typically, seal systems are positioned to prevent the high temperature and pressure air from flowing into sensitive areas.

Loss of oil from the bearing compartments, at the location of the seals in particular, can have negative consequences to engine performance, durability, or operation. Oil that weeps through the seal system may also travel into the compressor system or turbine as bleeding into the compressor may lead to imbalance concerns or customer bleed contamination while bleeding into the turbine may lead to thermal operational effects.

SUMMARY

An oil drainback assembly for a bearing compartment of a gas turbine engine according to one disclosed non-limiting embodiment of the present disclosure includes a shaft with a threaded section along an axis, and an oil distribution passage transverse to the axis; a head transverse to the threaded section, and a drain passage that extends through the head and into communication with the oil distribution passage; and a windage blocker that extends from the base.

A further embodiment of any of the foregoing embodiments of the present disclosure includes that the windage blocker includes a first wall and a second wall that flank the drain passage.

A further embodiment of any of the foregoing embodiments of the present disclosure includes that the first wall is offset from the second wall.

A further embodiment of any of the foregoing embodiments of the present disclosure includes a nut receivable onto the threaded section.

A further embodiment of any of the foregoing embodiments of the present disclosure includes a directional fitting receivable onto the shaft and retained by the nut.

A further embodiment of any of the foregoing embodiments of the present disclosure includes that the directional fitting forms an annulus around the shaft.

A further embodiment of any of the foregoing embodiments of the present disclosure includes that the directional fitting forms an oil outlet passage from the annulus.

A bearing compartment of a gas turbine engine according to one disclosed non-limiting embodiment of the present disclosure includes a rotationally fixed structure defined about an engine longitudinal axis; a gutter section formed in the front support; and an oil drainback assembly mountable to the gutter section to direct oil into a drain passage to communicate oil from the gutter.

A further embodiment of any of the foregoing embodiments of the present disclosure includes that the rotationally fixed structure is a front support structure that extends forward of a seal assembly of the bearing compartment.

A further embodiment of any of the foregoing embodiments of the present disclosure includes a rotating slinger mounted to the seal assembly, the rotating slinger inboard of the gutter section with respect to the engine longitudinal axis.

A further embodiment of any of the foregoing embodiments of the present disclosure includes that the rotationally fixed structure at least partially separates an oil-wetted zone from a non-oil-wetted zone in the bearing compartment.

A further embodiment of any of the foregoing embodiments of the present disclosure includes that the oil drainback assembly is mountable to the gutter section through an aperture formed in the gutter section at bottom dead center.

A further embodiment of any of the foregoing embodiments of the present disclosure includes that the oil drainback assembly is mountable to the gutter section via a nut.

A further embodiment of any of the foregoing embodiments of the present disclosure includes a directional fitting retained by the nut.

A further embodiment of any of the foregoing embodiments of the present disclosure includes that the directional fitting directs oil into an oil-wetted zone.

A method for capturing wept oil in a bearing compartment of a gas turbine engine according to one disclosed non-limiting embodiment of the present disclosure includes forming an aperture in a gutter section of a rotationally fixed structure defined about an engine longitudinal axis, the rotationally fixed structure at least partially separates an oil-wetted zone from a non-oil-wetted zone in the bearing compartment; and mounting an oil drainback assembly in the aperture to direct wept oil from a seal assembly through oil drainback assembly and into the oil-wetted zone.

A further embodiment of any of the foregoing embodiments of the present disclosure includes positioning the windage blocker to extend from a wall in a gutter section, the drain hole positioned at least partially on the wall.

A further embodiment of any of the foregoing embodiments of the present disclosure includes creating both a calming area for oil to pool and build head pressure for the oil to drain down the drain hole as well as a pumping action due to the direction of rotation of the recirculation zone.

A further embodiment of any of the foregoing embodiments of the present disclosure includes changing an oil concentration circumferentially around the gutter section due to the presence of the windage blocker.

The foregoing features and elements may be combined in various combinations without exclusivity, unless expressly indicated otherwise. These features and elements as well as the operation of the invention will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
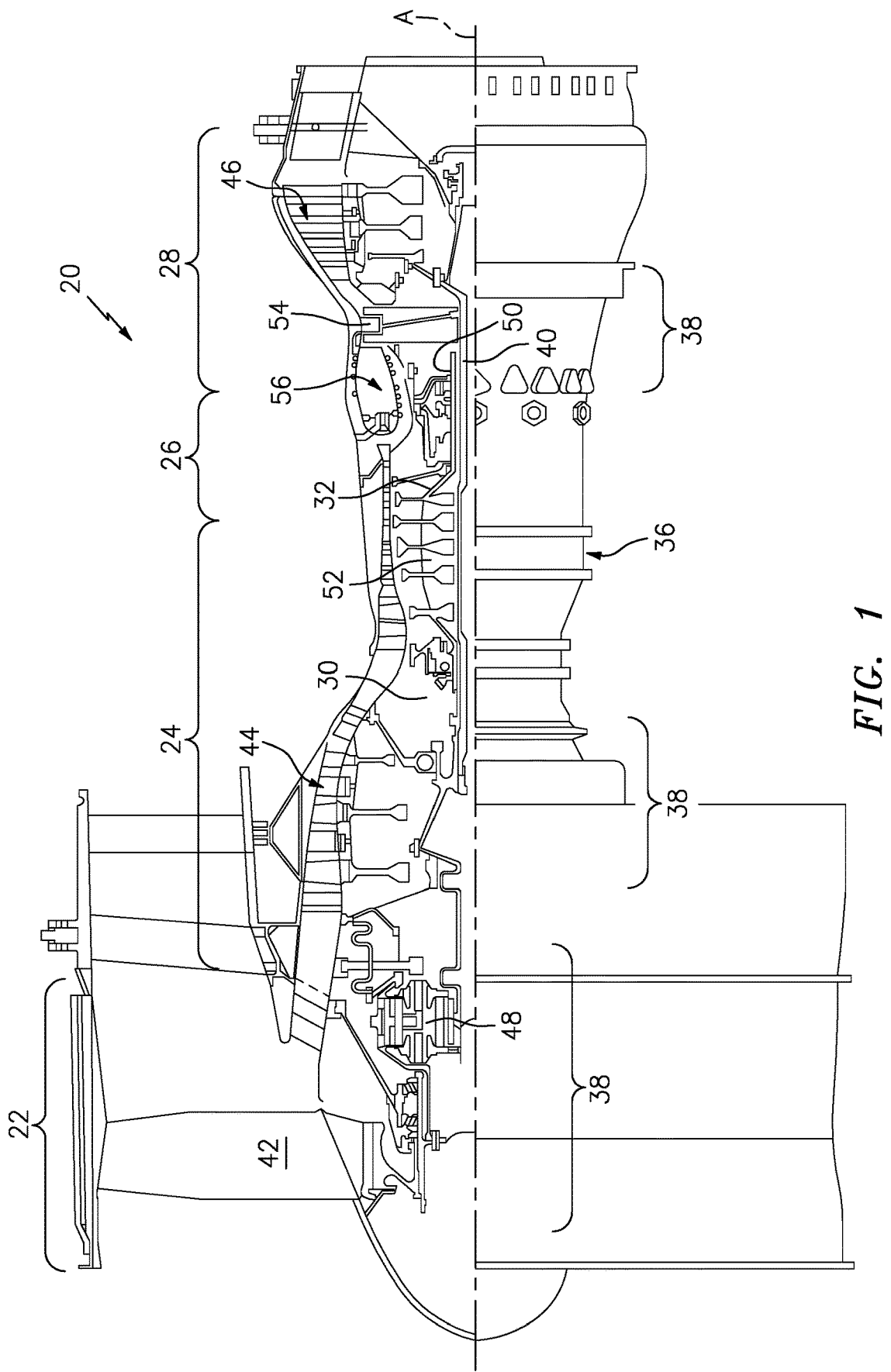
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine architectures might include an augmentor section and exhaust duct section among other systems or features.

The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

The engine 20 generally includes a low spool 30 and a high spool 32 mounted for rotation about an engine central longitudinal axis A relative to an engine static structure 36 via several bearing compartments 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor 52 ("HPC") and high pressure turbine 54 ("HPT"). A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by respective bearing compartments 38.

Figure 2:
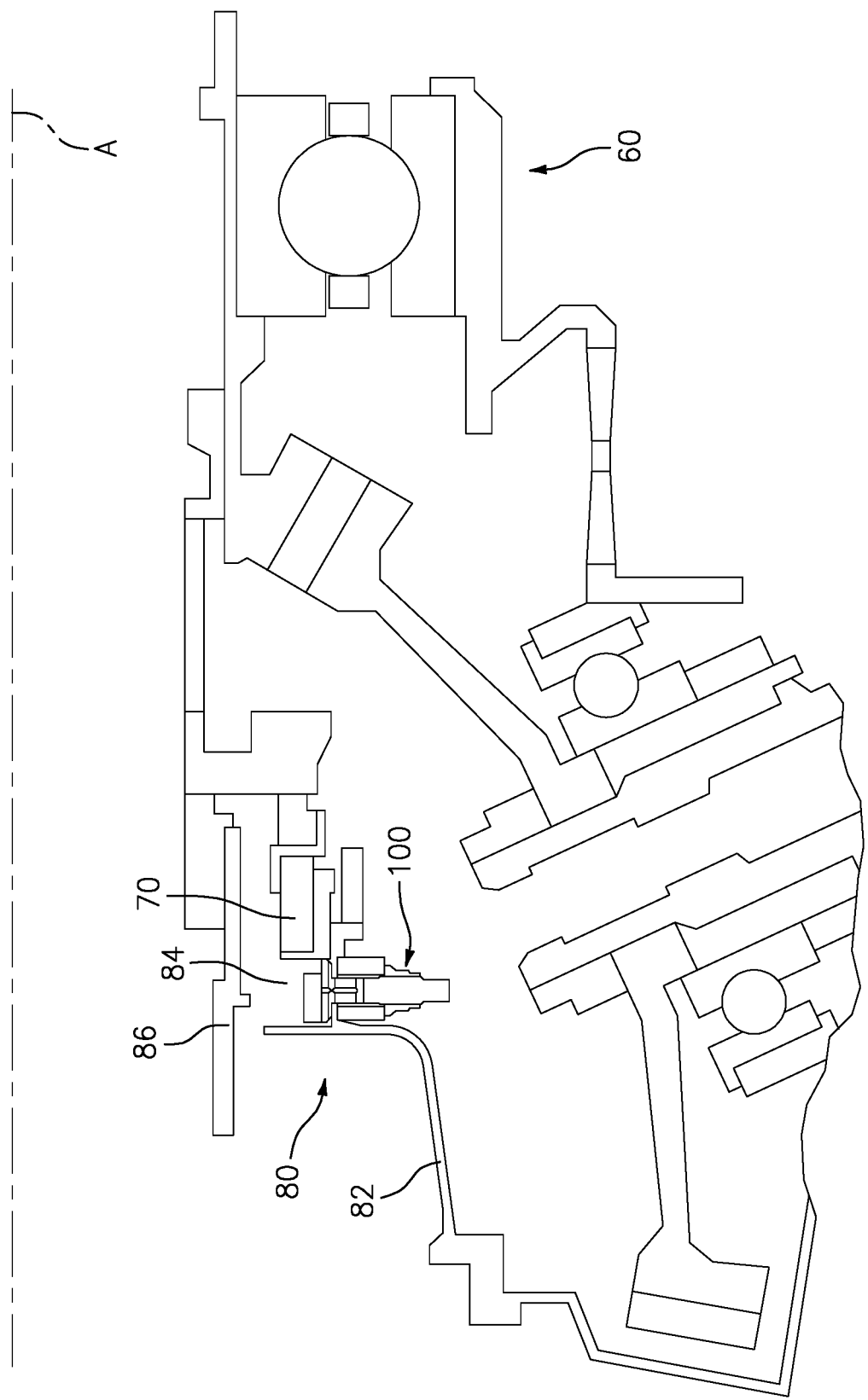
FIG. 2 is a sectional view of a bearing compartment with an oil drainback system.

With reference to FIG. 2, each of the multiple of bearing compartments 38 include one or more bearings 60 (bearing compartment illustrated schematically) and one or more seal system 70 (only the forward seal of the bearing compartment illustrated schematically). The bearings 60 and seal system 70 respectively support and interface with the shafts 40, 50 (FIG. 1) of the respective low spool 30 and high spool 32 along the engine central longitudinal axis A.

The seal system 70 can include carbon seals, mechanical seals, brush seals, etc. The seal system 70 operates to seal the bearing compartments 38, i.e., to form an oil-wetted zone from a dry zone. So, for example, the interior of each bearing compartment 38 may be referred to as the oil-wetted zone while the region external thereto may be referred to as the dry zone. The bearings 60 support the low spool 30 and the high spool 32 and the seal system 70 separates the oil-wetted zone from the dry zone to define the boundaries of each bearing compartment 38. Although particular bearing compartments and bearing arrangements are illustrated in the disclosed non-limiting embodiment, other bearing compartments and bearing arrangements in other engine architectures will also benefit herefrom.

Figure 3:
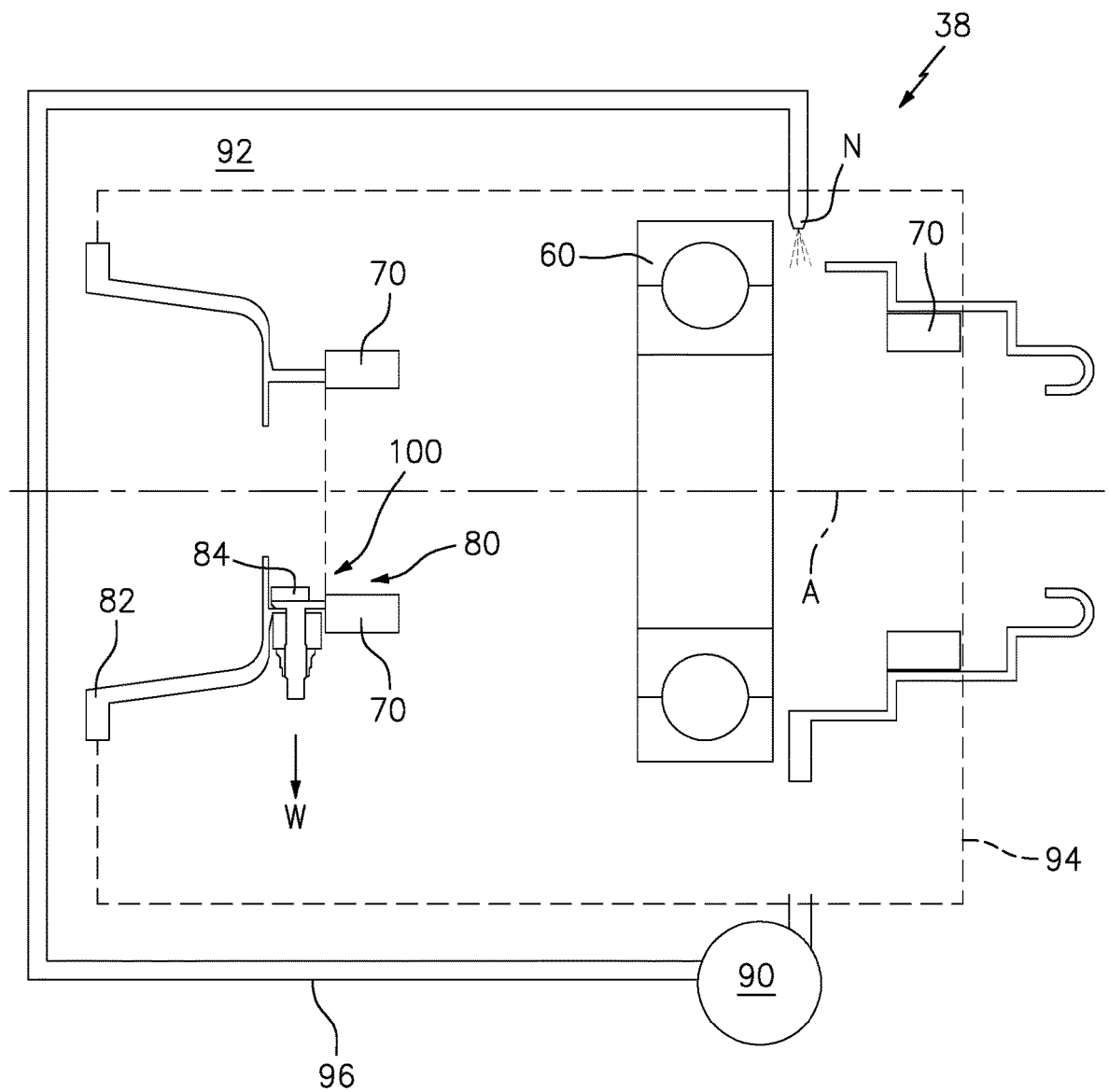
FIG. 3 is a schematic view of an oil flow path for a bearing compartment with an oil drainback system.

An oil drainback system 80 may include a rotationally fixed structure 82 such as an engine front support that includes a gutter section 84 to collect egressed oil (e.g., weepage from the oil-wetted zone which may occur for a variety of reasons including wear, failures, or operation at undesirable pressures). The gutter section 84 is inboard of a rotating slinger 86 which, in this embodiment also partially surrounds the seal system 70. The gutter section 84 of the rotationally fixed structure 82 accumulates the weeped oil ("w"; FIG. 3) for communication back into the oil-wetted zone. Although an engine front support is disclosed in the illustrated embodiment, various structures will benefit herefrom.

With reference to FIG. 3, oil flow through and around the bearing compartment 38 is schematically illustrated. Oil from other locations within the bearing compartment and/or which has reached the buffer air cavity 92 (e.g., "dry" zone; schematically indicated as the space around oil-wetted zone 94) is collected via the oil drainback system 80. The oil can be collected, for example by gravity, in the rotationally fixed structure 82, then flowed at pressure typically influenced by pressure in the buffer air cavity 92, to an oil drainback assembly 100. Oil and air are typically exposed to the higher pressure which is typically present in the buffer air cavity 92. A pump 90 scavenges oil from the oil-wetted zone 94 which can then be introduced back into the oil-wetted zone 94 through a flow passage 96 via spray nozzles N and the like.

Figure 4:
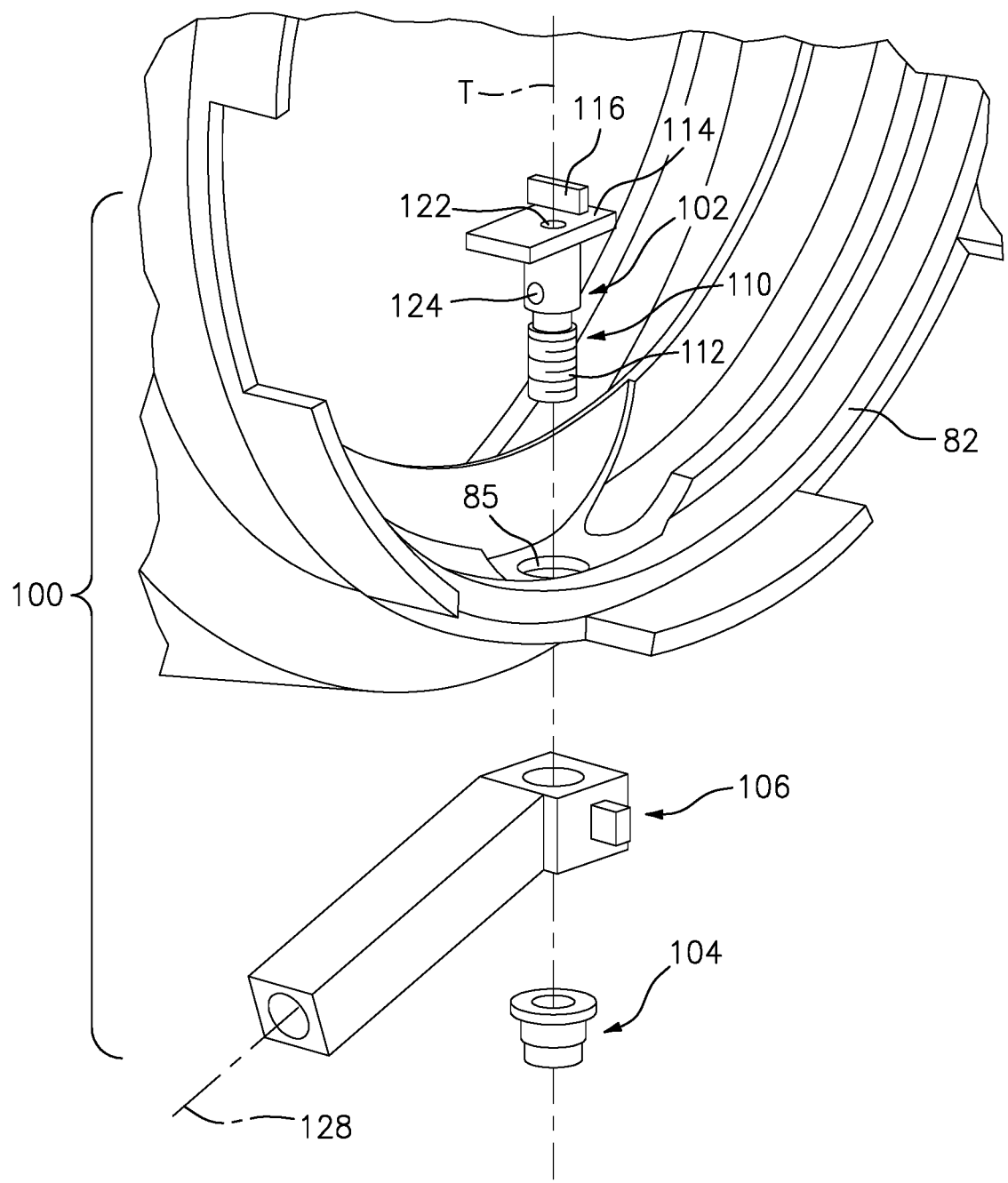
FIG. 4 is an exploded view of an oil drainback assembly for the oil drainback system of FIG. 2.

With reference to FIG. 4, the gutter section 84 of the rotationally fixed structure 82 collects egressed oil from the seal system 70 before the oil reaches the engine flow path and ultimately the customer bleed. Due to the close proximity of the rotor to the rotationally fixed structure 82, the windage that occurs within the gutter section 84 can be high. Due to the high windage, the oil drainback assembly 100 may be installed to remove energy from the oil and promote drainage from the gutter section 84 to the oil-wetted zone.

The oil drainback assembly 100 may be readily installed in the rotationally fixed structure 82 via the machining of an aperture 85 in a desired location such as bottom dead center. In other words, the oil drainback assembly 100 may be installed in a maintenance environment to replace, for example relatively small drain apertures that may not otherwise provide sufficient oil drainage especially under high windage conditions.

The oil drainback assembly 100 includes an oil drainback fitting 102, a nut 104, and a directional fitting 106. The oil drainback fitting 102 generally includes a shaft 110 with a threaded section 112 along an axis T. A head 114 is transverse to the shaft 110 and includes a windage blocker 116 that extends from the head 114. An oil drain passage 118 extends through the head 114 and the shaft 110 via an oil return hole metering orifice 122 adjacent to the windage blocker 116 (also shown in FIG. 5). One or more oil distribution passages 124 may be located transverse to, and communicates with, the oil drain passage 118.

Figure 5:
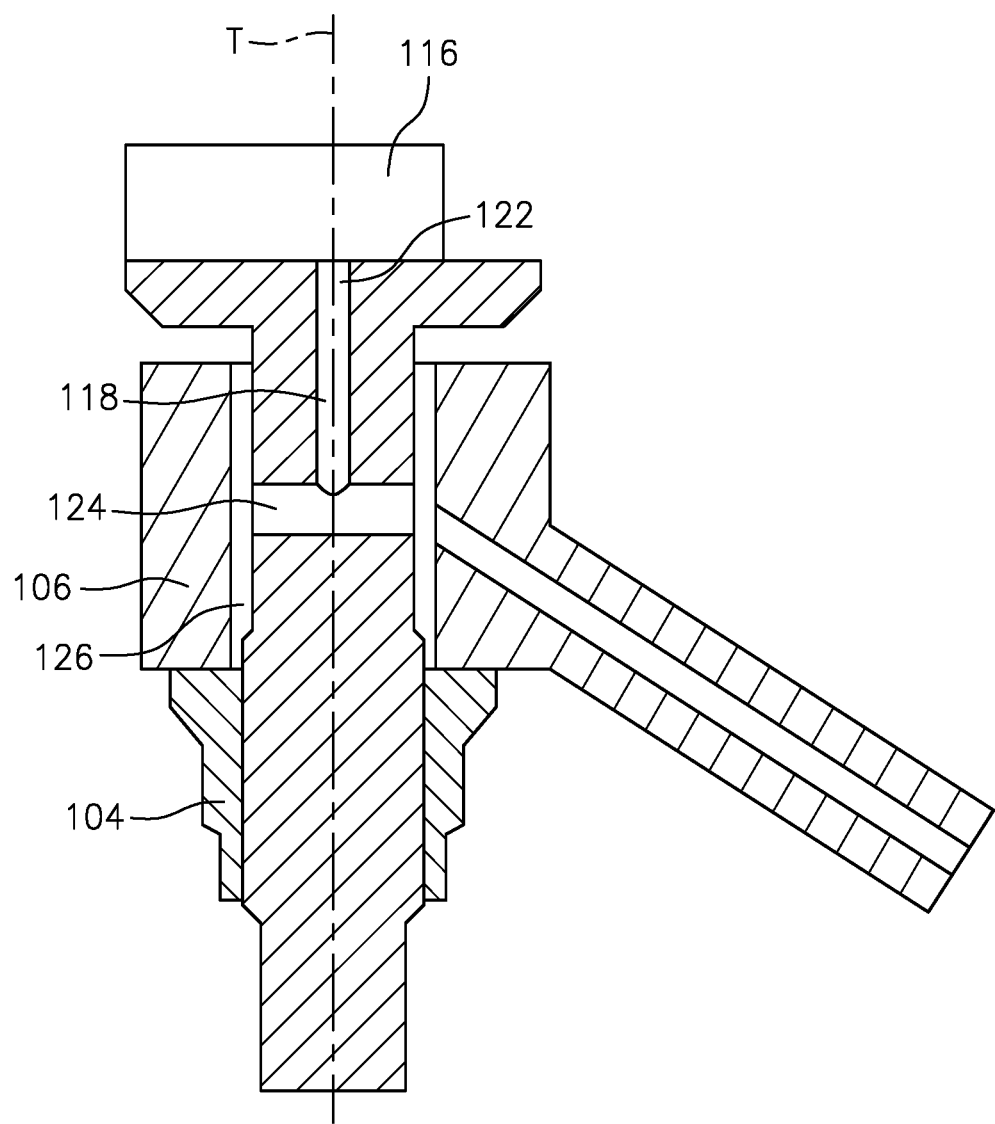
FIG. 5 is a sectional view of the oil drainback assembly mounted within an oil flow path gutter oil concentration in which windage forces are generated in a gutter section.

With reference to FIG. 5, the directional fitting 106 fits onto the shaft 110 and forms an annulus 126 around the shaft 110 to collect and communicate oil into a directional passage 128 (FIG. 4) of the directional fitting 106. The directional passage 128 may be positioned around the axis T to direct the weeped oil in a particular direction within the oil-wetted zone.

The nut 104 retains the directional fitting 106 to the rotationally fixed structure 82. That is, the rotationally fixed structure 82 is sandwiched between the head 114 and the directional fitting 106. Any fixed structure may thereby be modified to include the oil drainback assembly 100 with the expedient of forming an aperture at the desired location.

Figure 6:
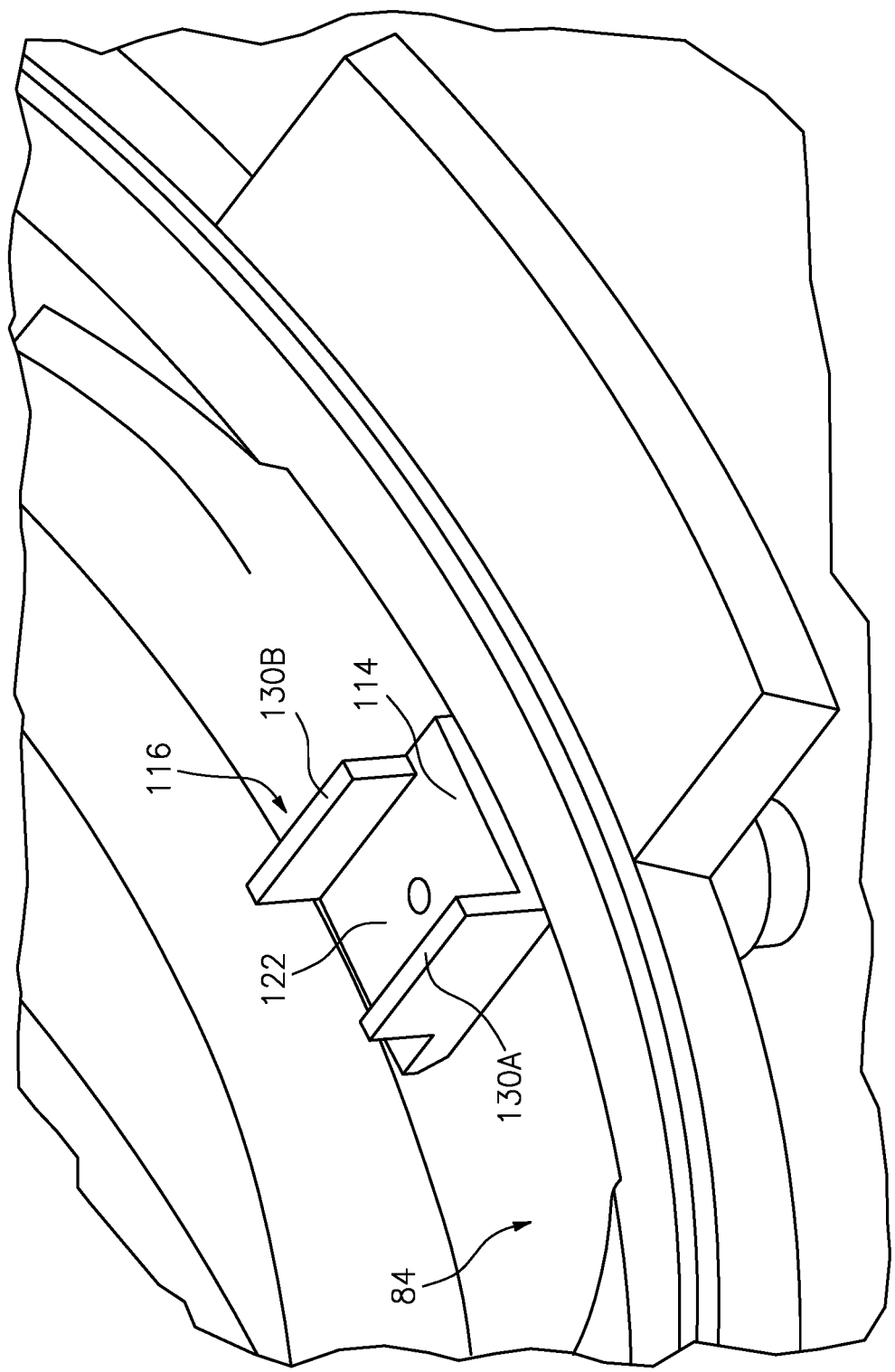
FIG. 6 is an expanded view of a windage blocker baffle for the oil drainback assembly.

With reference to FIG. 6, the windage blocker 116 may include one or more walls 130A, 130B (two offset walls illustrated) which generate a vortex which creates an oil re-circulation zone and promotes oil drainage down the oil return hole metering orifice 122. In other words, pressure is increased in front of the windage blocker 116, creating a "calm" recirculation zone between the walls 130A, 130B. The vortex creates both a calming area for oil to pool and build head pressure to drain down the oil return hole metering orifice 122 as well as generate some pumping action due to the direction of rotation of the recirculation zone (vortex).

The oil drainback assembly 100 facilitates capturing wept oil and returning it back into the lubrication system. This can reduce the effective oil consumption of the system, and prevent oil from egressing overboard (creating EHS or maintenance concerns) or entering the flowpath which can cause cabin fumes or cabin odor concerns. The bolt-like design of the oil drainback assembly 100, minimizes components and facilitates installation in a desired location. By adding the oil return hole metering orifice, the optimal hole can be determined during development on the relatively inexpensive part, rather than the more expensive castings and machining.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An oil drainback assembly for a bearing compartment of a gas turbine engine comprising:
   a shaft with a threaded section along an axis, and an oil distribution passage transverse to the axis;
   a head transverse to the threaded section, and a drain passage that extends through the head and into communication with the oil distribution passage;
   a windage blocker that extends from the head;
   a nut receivable onto the threaded section; and
   a directional fitting receivable onto the shaft and retained by the nut.

2. The assembly as recited in claim 1, wherein the windage blocker includes a first wall and a second wall that flank the drain passage on the head.

3. The assembly as recited in claim 2, wherein the first wall is offset from the second wall.

4. The assembly as recited in claim 1, wherein the directional fitting forms an annulus around the shaft.

5. The assembly as recited in claim 4, wherein the directional fitting forms an oil outlet passage from the annulus.

6. A bearing compartment of a gas turbine engine comprising:
   a rotationally fixed structure defined about an engine longitudinal axis;
   a gutter section formed in the front support; and
   an oil drainback assembly mountable to the gutter section to direct oil into a drain passage to communicate oil from the gutter, wherein the oil drainback assembly comprises:
   a shaft with a threaded section along an axis, and an oil distribution passage transverse to the axis;
   a head transverse to the threaded section, and a drain passage that extends through the head and into communication with the oil distribution passage; and
   a windage blocker that extends from the head, wherein the oil drainback assembly is mountable to the gutter section via a nut, and further comprising a directional fitting retained by the nut.

7. The bearing compartment as recited in claim 6, wherein the rotationally fixed structure is a front support structure that extends forward of a seal assembly of the bearing compartment.

8. The bearing compartment as recited in claim 7, further comprising a rotating slinger mounted to the seal assembly, the rotating slinger inboard of the gutter section with respect to the engine longitudinal axis.

9. The bearing compartment as recited in claim 6, wherein the rotationally fixed structure at least partially separates an oil-wetted zone from a non-oil-wetted zone in the bearing compartment.

10. The bearing compartment as recited in claim 6, wherein the oil drainback assembly is mountable to the gutter section through an aperture formed in the gutter section at bottom dead center.

11. The bearing compartment as recited in claim 6, wherein the directional fitting directs oil into an oil-wetted zone.

12. A method for capturing wept oil in a bearing compartment of a gas turbine engine comprising:
   forming an aperture in a gutter section of a rotationally fixed structure defined about an engine longitudinal axis, the rotationally fixed structure at least partially separates an oil-wetted zone from a non-oil-wetted zone in the bearing compartment; and mounting an oil drainback assembly in the aperture to direct wept oil from a seal assembly through oil drainback assembly and into the oil-wetted zone, wherein the oil drainback assembly comprises:

a shaft with a threaded section along an axis, and an oil distribution passage transverse to the axis;

a head transverse to the threaded section, and a drain passage that extends through the head and into communication with the oil distribution passage; and a windage blocker that extends from the head, wherein the oil drainback assembly further comprises a nut receivable onto the threaded section and a directional fitting retained by the nut.

13. The method as recited in claim 12, further comprising creating both a calming area for oil to pool and build head pressure for the oil to drain down the drain passage as well as a pumping action due to the direction of rotation of the recirculation zone.

14. The method as recited in claim 12, further comprising changing an oil concentration circumferentially around the gutter section due to the presence of the windage blocker.

\* \* \* \* \*